(12) United States Patent
Sato

(10) Patent No.: US 9,937,915 B2
(45) Date of Patent: Apr. 10, 2018

(54) HYBRID VEHICLE

(71) Applicant: Toyota Jidosha Kabushiki Kaisha, Toyota-shi, Aichi-ken (JP)

(72) Inventor: Keita Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/337,787

(22) Filed: Oct. 28, 2016

(65) Prior Publication Data

US 2017/0129474 A1    May 11, 2017

(30) Foreign Application Priority Data

Nov. 5, 2015  (JP) ................ 2015-217313

(51) Int. Cl.
| | |
|---|---|
| B60L 11/00 | (2006.01) |
| B60W 20/15 | (2016.01) |
| B60K 6/26 | (2007.10) |
| B60K 6/445 | (2007.10) |
| B60K 6/50 | (2007.10) |
| B60L 11/12 | (2006.01) |
| B60L 11/14 | (2006.01) |
| B60W 30/20 | (2006.01) |

(52) U.S. Cl.
CPC .............. *B60W 20/15* (2016.01); *B60K 6/26* (2013.01); *B60K 6/445* (2013.01); *B60K 6/50* (2013.01); *B60L 11/12* (2013.01); *B60L 11/14* (2013.01); *B60W 30/20* (2013.01); *B60W 2710/083* (2013.01); *B60Y 2200/92* (2013.01); *B60Y 2300/20* (2013.01); *B60Y 2300/60* (2013.01); *B60Y 2400/112* (2013.01); *Y10S 903/906* (2013.01); *Y10S 903/91* (2013.01)

(58) Field of Classification Search
CPC .......... B60K 6/365; B60K 6/445; B60K 6/50; B60W 20/10; B60W 20/15; B60W 30/20; B60W 2710/083; B60L 11/12; B60L 11/14; B60Y 2200/92; B60Y 2400/112; B60Y 2300/60; Y10S 903/906; Y10S 903/91
USPC ...... 701/22; 180/65.21, 65.25; 903/910, 946
See application file for complete search history.

(56) References Cited

U.S. PATENT DOCUMENTS

| | | | | |
|---|---|---|---|---|
| 6,886,648 B1 * | 5/2005 | Hata | ....................... | B60K 6/365 |
| | | | | 180/65.235 |
| 2006/0113129 A1 * | 6/2006 | Tabata | ................... | B60K 6/365 |
| | | | | 180/65.25 |
| 2013/0173108 A1 | 7/2013 | Hashimoto | | |

FOREIGN PATENT DOCUMENTS

| | | |
|---|---|---|
| JP | 2008-265600 A | 11/2008 |
| JP | 2012-232690 A | 11/2012 |

(Continued)

*Primary Examiner* — Gertrude Arthur Jeanglaude
(74) *Attorney, Agent, or Firm* — Dinsmore & Shohl LLP

(57) ABSTRACT

In a hybrid vehicle, in double-drive mode of an electric drive mode, in which the hybrid vehicle travels by using two motors, that is, a first motor and a second motor, in a state where execution of vibration damping control with the use of the second motor is being required, when it is possible to output a total torque, which is the sum of a second distribution torque and a vibration damping torque, from the second motor to a drive shaft, the vibration damping control with the use of the second motor is executed; whereas, when it is not possible to output the total torque from the second motor to the drive shaft, vibration damping control with the use of the first motor is executed.

4 Claims, 9 Drawing Sheets

(56) References Cited

FOREIGN PATENT DOCUMENTS

JP      2013-203385 A    10/2013
WO      2012/029170 A1   3/2012

\* cited by examiner

HYBRID VEHICLE

CROSS-REFERENCE TO RELATED APPLICATIONS

This application claims priority to Japanese Patent Application No. 2015-217313 filed on Nov. 5, 2015, the entire contents of which are hereby incorporated by reference.

BACKGROUND

1. Technical Field

The present disclosure relates to a hybrid vehicle.

2. Description of Related Art

Conventionally, there is suggested a hybrid vehicle (see, for example, Japanese Patent Application Publication No. 2012-232690 (JP 2012-232690 A). In this hybrid vehicle, a first motor is connected to a sun gear of a planetary gear set, an engine is connected to a carrier, a drive shaft is connected to a ring gear, and a second motor is connected to the drive shaft. When an execution condition of vibration damping control with the use of the second motor is satisfied, the sum of a torque command of the second motor and a vibration damping torque is set for an execution torque, and the second motor is controlled such that the execution torque is output from the second motor to the drive shaft. This hybrid vehicle reduces the vibrations of the vehicle through such control.

SUMMARY

In the above-described hybrid vehicle, when the torque command of the second motor is close to an upper limit torque of the second motor, the vibration damping torque may not be sufficiently output from the second motor to the drive shaft, with the result that the vibrations of the vehicle may not be sufficiently reduced.

In view of the above-described inconvenience, the present disclosure provides a hybrid vehicle that further reliably reduces the vibrations of the vehicle.

An aspect of the present disclosure provides a hybrid vehicle. The hybrid vehicle includes an engine, a first motor, a second motor, a planetary gear set, a rotation restriction mechanism, a battery and an electronic control unit. The planetary gear set includes at least one planetary gear. At least part of rotating elements of the at least one planetary gear are connected to the engine, the first motor, the second motor and a drive shaft coupled to an axle. The rotation restriction mechanism is configured to restrict rotation of the engine. The battery is configured to exchange electric power with the first motor and the second motor. The electronic control unit is configured to: in double-drive mode in which the hybrid vehicle travels by using torque from the first motor and the second motor while the engine is placed in a rotation stopped state, (i) control the first motor so as to output a first distribution torque of a required torque from the first motor to the drive shaft, the required torque being a torque required for the drive shaft to propel the hybrid vehicle, (ii) control the second motor so as to output a second distribution torque of the required torque from the second motor to the drive shaft, (iii) execute first control when it is possible to output a total torque from the second motor to the drive shaft at a time when execution of vibration damping control with the use of the second motor is being required, the first control being control in which the second motor is controlled so as to output a vibration damping torque to the drive shaft by using torque from only the second motor, the total torque being a sum of the second distribution torque and the vibration damping torque that is a torque required for the drive shaft for the vibration damping control, and (iv) execute second control when it is not possible to output the total torque from the second motor to the drive shaft, the second control being control in which the first motor is controlled so as to output the vibration damping torque to the drive shaft by using torque from only the first motor.

With the above-described hybrid vehicle, in the double-drive mode in which the hybrid vehicle travels by using torque from the first motor and the second motor while the engine is placed in a rotation stopped state, the first motor and the second motor are controlled so as to output the first distribution torque of the required torque that is a torque required for the drive shaft to propel the hybrid vehicle from the first motor to the drive shaft and the second distribution torque of the required torque is output from the second motor to the drive shaft. In the double-drive mode, in a state where execution of vibration damping control with the use of the second motor is being required, when it is possible to output the total torque from the second motor to the drive shaft, the first control is executed. The total torque is a sum of the second distribution torque and the vibration damping torque that is a torque required for the drive shaft for the vibration damping control. In the first control, the second motor is controlled so as to output the vibration damping torque to the drive shaft by using torque from only the second motor. In the double-drive mode, in a state where execution of the vibration damping control with the use of the second motor is being required, when it is not possible to output the total torque from the second motor to the drive shaft, the second control is executed. In the second control, the first motor is controlled so as to output the vibration damping torque to the drive shaft by using torque from only the first motor. That is, even when it is not possible to output the vibration damping torque to the drive shaft by using torque from only the second motor, the vibration damping torque is output to the drive shaft by using torque from only the first motor. With such control for the hybrid vehicle, it is possible to further reliably reduce the vibrations of the vehicle.

In the hybrid vehicle, the electronic control unit may be configured to, in the double-drive mode, in a state where execution of the vibration damping control with the use of the second motor is being required and it is not possible to output the total torque from the second motor to the drive shaft, execute the second control when a first efficiency is higher than a second efficiency. The first efficiency is an efficiency at a time when the first distribution torque is output from the first motor to the drive shaft, and the second efficiency is an efficiency at the time when the second distribution torque is output from the second motor to the drive shaft. With such control for the hybrid vehicle, it is possible to prevent a decrease in the efficiency of the vehicle at a time when the vibration damping torque is output to the drive shaft.

Another aspect of the present disclosure provides a hybrid vehicle. The hybrid vehicle includes an engine, a first motor, a second motor, a planetary gear set, a rotation restriction mechanism, a battery and an electronic control unit. The planetary gear set includes at least one planetary gear. At least part of rotating elements of the at least one planetary gear are connected to the engine, the first motor, the second motor and a drive shaft coupled to an axle. The rotation restriction mechanism is configured to restrict rotation of the engine. The battery is configured to exchange electric power with the first motor and the second motor. The electronic control unit is configured to: in double-drive mode in which the hybrid vehicle travels by using torque from the first motor and the second motor while the engine is placed in a rotation stopped state, (i) control the first motor so as to output a first distribution torque of a required torque from the first motor to the drive shaft, the required torque being a torque required for the drive shaft to propel the hybrid vehicle, (ii) control the second motor so as to output a second distribution torque of the required torque from the second motor to the drive shaft, (iii) execute first control when it is possible to output a total torque from the second motor to the drive shaft at a time when execution of vibration damping control with the use of the second motor is being required, the first control being control in which the second motor is controlled so as to output a vibration damping torque to the drive shaft by using torque from only the second motor, the total torque being a sum of the second distribution torque and the vibration damping torque that is a torque required for the drive shaft for the vibration damping control, and (iv) execute third control when it is not possible to output the total torque from the second motor to the drive shaft, the third control being control in which the first motor and the second motor are controlled so as to output the vibration damping torque to the drive shaft by using a torque from the first motor and the second motor.

With the above-described hybrid vehicle, in the double-drive mode in which the hybrid vehicle travels by using torque from the first motor and the second motor while the engine is placed in a rotation stopped state, the first motor and the second motor are controlled so as to output the first distribution torque of the required torque that is a torque required for the drive shaft to propel the hybrid vehicle from the first motor to the drive shaft and the second distribution torque of the required torque is output from the second motor to the drive shaft. In the double-drive mode in a state where execution of vibration damping control with the use of the second motor is being required, when it is possible to output the total torque from the second motor to the drive shaft, the first control is executed. The total torque is the sum of the second distribution torque and the vibration damping torque that is a torque required for the drive shaft for the vibration damping control. In the first control, the second motor is controlled so as to output the vibration damping torque to the drive shaft by using torque from only the second motor. In the double-drive mode, in a state where execution of the vibration damping control with the use of the second motor is being required, when it is not possible to output the total torque from the second motor to the drive shaft, the third control is executed. In the third control, the first motor and the second motor are controlled the vibration damping torque to the drive shaft by using torque from the first motor and the second motor. That is, even when it is not possible to output the vibration damping torque to the drive shaft by using torque from only the second motor, the vibration damping torque is output to the drive shaft by using a torque from the first motor and the second motor. With such control for the hybrid vehicle, it is possible to further reliably reduce the vibrations of the vehicle.

In the hybrid vehicle, the electronic control unit may be configured to, in the double-drive mode, in a state where execution of the vibration damping control with the use of the second motor is being required and it is not possible to output the total torque from the second motor to the drive shaft, execute the third control when a first efficiency is lower than or equal to a second efficiency. The first efficiency is an efficiency at a time when the first distribution torque is output from the first motor to the drive shaft, and the second efficiency is an efficiency at a time when the second distribution torque is output from the second motor to the drive shaft. With such control for the hybrid vehicle, it is possible to prevent a decrease in the efficiency of the vehicle at the time when the vibration damping torque is output to the drive shaft.

The planetary gear set may include a single planetary gear, a sun gear of the planetary gear may be connected to the first motor, a carrier of the planetary gear may be connected to the engine, and a ring gear of the planetary gear may be connected to the drive shaft and the second motor. Alternatively, the planetary gear set may include two planetary gears, a sun gear of the first planetary gear may be connected to the first motor, a carrier of the first planetary gear may be connected to the engine, a ring gear of the first planetary gear may be connected to the drive shaft, a sun gear of the second planetary gear may be connected to the second motor, a carrier of the second planetary gear may be connected to a case (fixed member), and a ring gear of the second planetary gear may be connected to the drive shaft. Alternatively, the planetary gear set may include two planetary gears, a clutch and a brake, a sun gear of the first planetary gear may be connected to the second motor, a carrier of the first planetary gear and a carrier of the second planetary gear may be connected to the drive shaft, a ring gear of the first planetary gear may be connected to the engine, a sun gear of the second planetary gear may be connected to the first motor, the clutch may be configured to connect the sun gear of the first planetary gear and the second motor to the ring gear of the second planetary gear or release the connection therebetween, and the brake may be configured to fix the ring gear of the second planetary gear such that the ring gear is non-rotatable or release the ring gear such that the ring gear is rotatable.

The rotation restriction mechanism may be a one-way clutch that permits rotation of the engine in a positive rotation direction and restricts (prohibits) rotation of the engine in a negative rotation direction or may be a brake that fixes the engine such that the engine is non-rotatable or release the engine such that the engine is rotatable.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described.

Figure 1:
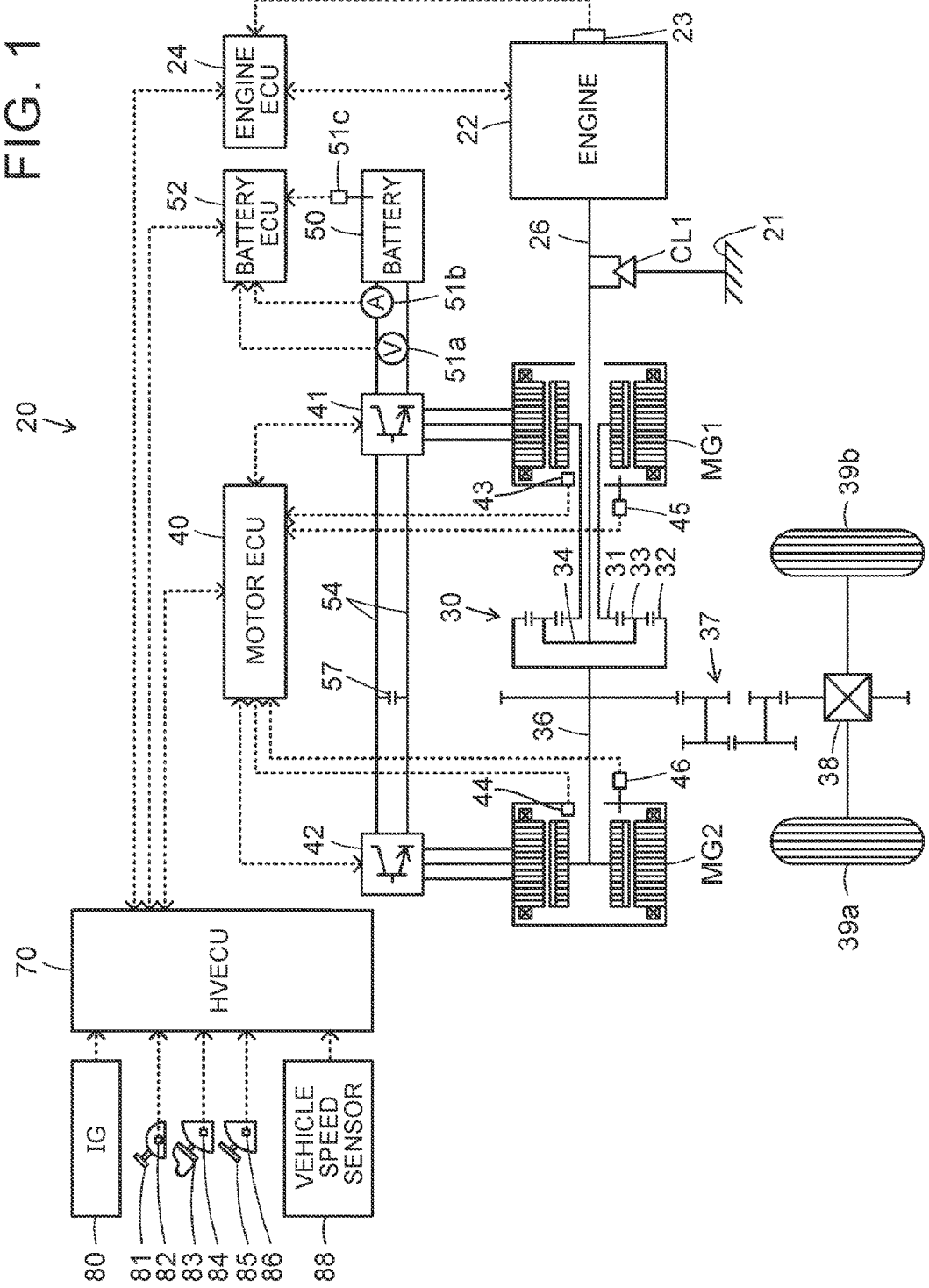
FIG. 1 is a configuration view that schematically shows the configuration of a hybrid vehicle according to a first embodiment as one example of the present disclosure.

FIG. 1 is a configuration view that schematically shows the configuration of a hybrid vehicle 20 according to a first embodiment of the present disclosure. As shown in FIG. 1, the hybrid vehicle 20 according to the first embodiment includes an engine 22, a planetary gear 30 that serves as a planetary gear set, a one-way clutch CL1, motors MG1, MG2, inverters 41, 42, a battery 50 and a hybrid electronic control unit (hereinafter, referred to as HV-ECU) 70.

The engine 22 is configured as an internal combustion engine that outputs power by using gasoline, light oil, or the like, as fuel. The engine 22 undergoes operation control that is executed by an engine electronic control unit (hereinafter, referred to as engine ECU) 24.

Although not shown in the drawing, the engine ECU 24 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute operation control over the engine 22, are input to the engine ECU 24 via the input port. The signals that are input to the engine ECU 24 include a crank angle $\theta cr$ and a throttle opening degree TH. The crank angle $\theta cr$ is input from a crank position sensor 23 that detects a rotation position of a crankshaft 26 of the engine 22. The throttle opening degree TH is input from a throttle valve position sensor that detects a position of a throttle valve.

Various control signals for operation control over the engine 22 are output from the engine ECU 24 via the output port. The signals that are output from the engine ECU 24 include a drive control signal that is output to a throttle motor that adjusts the position of the throttle valve, a drive control signal that is output to a fuel injection valve, and a drive control signal that is output to an ignition coil integrated with an ignitor.

The engine ECU 24 is connected to the HV-ECU 70 via the communication port. The engine ECU 24 executes operation control over the engine 22 in response to a control signal from the HV-ECU 70, and, where necessary, outputs data regarding the operating state of the engine 22 to the HV-ECU 70. The engine ECU 24 computes an angular velocity and rotation speed of the crankshaft 26, that is, an angular velocity $\omega e$ and rotation speed Ne of the engine 22, on the basis of the crank angle $\theta cr$ from the crank position sensor 23.

The planetary gear 30 is a single pinion planetary gear. The planetary gear 30 includes a sun gear 31, a ring gear 32, a plurality of pinion gears 33 and a carrier 34. The sun gear 31 is an external gear. The ring gear 32 is an internal gear. The plurality of pinion gears 33 are in mesh with the sun gear 31 and the ring gear 32. The carrier 34 supports the plurality of pinion gears 33 such that each pinion gear 33 is rotatable and revolvable. The rotor of the motor MG1 is connected to the sun gear 31. A drive shaft 36 is connected to the ring gear 32. The drive shaft 36 is coupled to drive wheels 39a, 39b via a differential gear 38 and a gear mechanism 37. The crankshaft 26 of the engine 22 is connected to the carrier 34.

The one-way clutch CL1 is connected to the crankshaft 26 of the engine 22 and the carrier 34 and also connected to a case 21 fixed to a vehicle body. The one-way clutch CL1 permits the engine 22 to rotate in a positive rotation direction with respect to the case 21, and restricts (prohibits) rotation of the engine 22 in a negative rotation direction with respect to the case 21.

The motor MG1 is, for example, a synchronous generator-motor. As described above, the rotor of the motor MG1 is connected to the sun gear 31 of the planetary gear 30. The motor MG2 is, for example, a synchronous generator-motor. The rotor of the motor MG2 is connected to the drive shaft 36. The inverters 41, 42 are connected to power lines 54 together with the battery 50. A smoothing capacitor 57 is connected to the power lines 54. Each of the motors MG1, MG2 is driven to rotate under switching control over a plurality of switching elements (not shown) of a corresponding one of the inverters 41, 42, which is executed by a motor electronic control unit (hereinafter, referred to as motor ECU) 40.

Although not shown in the drawing, the motor ECU 40 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute drive control over the motors MG1, MG2, are input to the motor ECU 40 via the input port. The signals that are input to the motor ECU 40 include rotation positions $\theta m1$, $\theta m2$, phase currents, and temperatures tm1, tm2. The rotation position $\theta m1$ is input from rotation position detection sensor 43 that detects the rotation position of the rotor of the motor MG1. The rotation position $\theta m2$ is input from rotation position detection sensor 44 that detects the rotation position of the rotor of the motor MG2. The phase currents are input from current sensors that respectively detect currents respectively flowing through the phases of each of the motors MG1, MG2. The temperature tm1 is input from a temperature sensor 45 that detects the temperature of the motor MG1. The temperature tm2 is input from a temperature sensor 46 that detects the temperature of the motor MG2.

Switching control signals, and the like, are output from the motor ECU 40 to switching elements (not shown) of the inverters 41, 42.

The motor ECU 40 is connected to the HV-ECU 70 via the communication port. The motor ECU 40 executes drive control over the motors MG1, MG2 in response to a control signal from the HV-ECU 70, and, where necessary, outputs data regarding the driving states of the motors MG1, MG2 to the HV-ECU 70. The motor ECU 40 computes the angular velocity $\theta m1$ and rotation speed Nm1 of the motor MG1 on the basis of the rotation position $\theta m1$ of the rotor of the motor MG1 from the rotation position detection sensor 43, and computes the angular velocity $\theta m2$ and rotation speed Nm2 of the motor MG2 on the basis of the rotation position $\theta m2$ of the rotor of the motor MG2 from the rotation position detection sensor 44. The motor ECU 40 computes a drive wheel angular velocity ωdw as a value obtained by converting the angular velocity of each of the drive wheels 39a, 39b to an angular velocity based on the drive shaft 36 (the rotary shaft of the motor MG2). The drive wheel angular velocity ωdw is allowed to be computed on the basis of signals from wheel speed sensors respectively installed at the drive wheels 39a, 39b.

The battery 50 is, for example, a lithium ion secondary battery or a nickel-metal hydride secondary battery. As described above, the battery 50 is connected to the power lines 54 together with the inverters 41, 42. The battery 50 is managed by a battery electronic control unit (hereinafter, referred to as battery ECU) 52.

Although not shown in the drawing, the battery ECU 52 is a microprocessor that mainly includes a CPU and that further includes a ROM, a RAM, input/output ports and a communication port in addition to the CPU. The ROM stores a processing program. The RAM temporarily stores data.

Signals from various sensors, which are required to manage the battery 50, are input to the battery ECU 52 via the input port. The signals that are input to the battery ECU 52 include a battery voltage Vb, a battery current Ib (the battery current Ib is a positive value when the battery 50 is discharged), and a battery temperature Tb. The battery voltage Vb is output from a voltage sensor 51a installed between the terminals of the battery 50. The battery current Ib is output from a current sensor 51b connected to the output terminal of the battery 50. The battery temperature Tb is output from a temperature sensor 51c connected to the battery 50.

The battery ECU 52 is connected to the HV-ECU 70 via the communication port, and, where necessary, outputs data regarding the state of the battery 50 to the HV-ECU 70. The battery ECU 52 computes a state of charge SOC on the basis of an accumulated value of the battery current Ib from the current sensor 51b. The state of charge SOC is the percentage of the capacity of dischargeable electric power from the battery 50 to the total capacity of the battery 50. The battery ECU 52 computes input and output limits Win, Wout on the basis of the computed state of charge SOC and the battery temperature Tb from the temperature sensor 51c. The input limit Win is an allowable charging power at or below which the battery 50 is allowed to be charged. The output limit Wout is an allowable discharging power at or below which the battery 50 is allowed to be discharged.

Although not shown in the drawing, the HV-ECU 70 is a microprocessor that mainly includes a CPU and that further includes a ROM, a RAM, input/output ports and a communication port in addition to the CPU. The ROM stores a processing program. The RAM temporarily stores data.

Signals from various sensors are input to the HV-ECU 70 via the input port. The signals that are input to the HV-ECU 70 include an ignition signal, a shift position SP, an accelerator operation amount Acc, a brake pedal position BP and a vehicle speed V. The ignition signal is output from an ignition switch 80. The shift position SP is output from a shift position sensor 82 that detects the operating position of a shift lever 81. The accelerator operation amount Acc is output from an accelerator pedal position sensor 84 that detects the depression amount of an accelerator pedal 83. The brake pedal position BP is output from a brake pedal position sensor 86 that detects the depression amount of a brake pedal 85. The vehicle speed V is output from a vehicle speed sensor 88.

As described above, the HV-ECU 70 is connected to the engine ECU 24, the motor ECU 40 and the battery ECU 52 via the communication port, and exchanges various control signals and data with the engine ECU 24, the motor ECU 40 and the battery ECU 52.

The thus configured hybrid vehicle 20 according to the first embodiment travels in hybrid drive mode (HV drive mode) or electric drive mode (EV drive mode). The HV drive mode is a drive mode in which the hybrid vehicle 20 travels by using power from the engine 22, the motor MG1 and the motor MG2. The EV drive mode is a drive mode in which the operation of the engine 22 is stopped and the hybrid vehicle 20 travels by using power from at least the motor MG2. The EV drive mode includes a single-drive mode and a double-drive mode. In the single-drive mode, no torque is output from the motor MG1, and the hybrid vehicle 20 travels by using torque from only the motor MG2. In the double-drive mode, the hybrid vehicle 20 travels by using torque from the motor MG1 and the motor MG2.

Next, the operation of the thus configured hybrid vehicle 20 according to the first embodiment, particularly, the operation at the time when the hybrid vehicle 20 travels in the double-drive mode, will be described.

Figure 2:
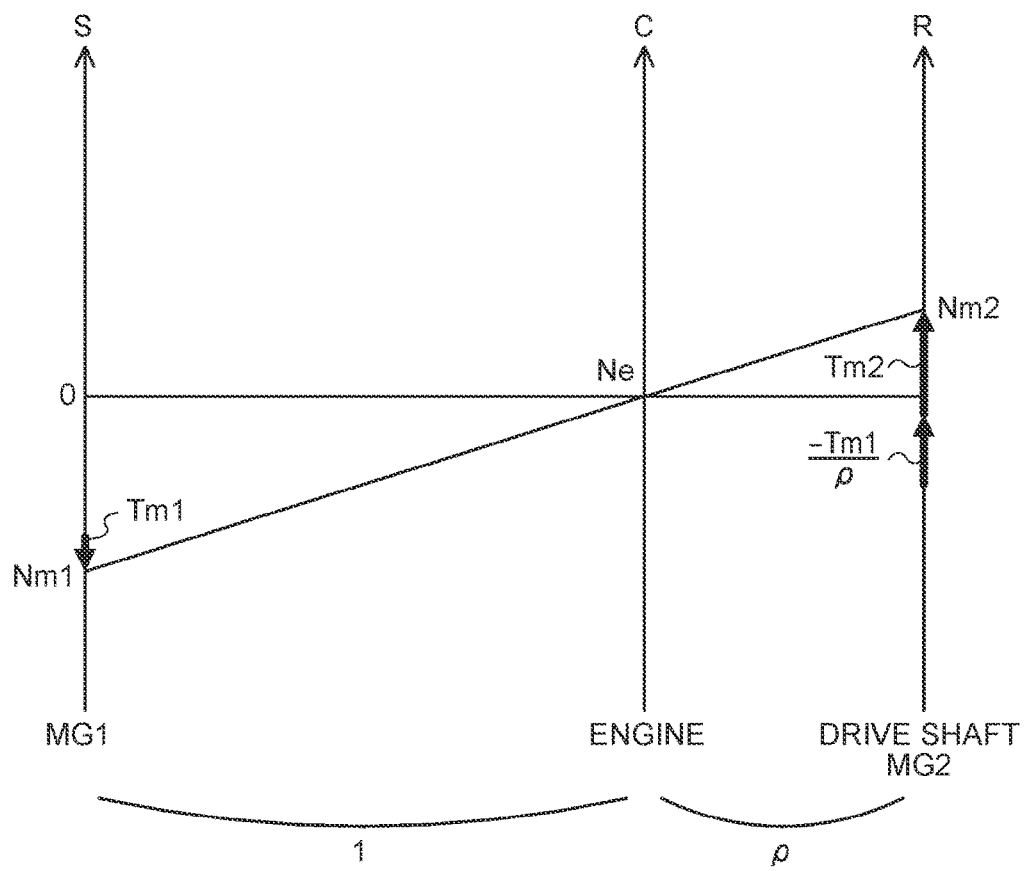
FIG. 2 is a view that illustrates an example of a nomograph of a planetary gear at the time when the hybrid vehicle travels in double-drive mode in the first embodiment.

FIG. 2 is a view that illustrates an example of a nomograph of the planetary gear 30 at the time when the hybrid vehicle 20 travels in the double-drive mode. In the graph, the left S-axis represents the rotation speed of the sun gear 31, that is, the rotation speed Nm1 of the motor MG1, the C-axis represents the rotation speed of the carrier 34, that is, the rotation speed Ne of the engine 22, and the R-axis represents the rotation speed Nr of the ring gear 32 (drive shaft 36), that is, the rotation speed Nm2 of the motor MG2. In the graph, the two wide-line arrows on the R-axis respectively indicate a torque ((−Tm1/ρ) that is output to the ring gear 32 (drive shaft 36) via the planetary gear 30 at the time when a torque Tm1 is output from the motor MG1 and a torque Tm2 that is output to the ring gear 32 at the time when the torque Tm2 is output from the motor MG2. As shown in FIG. 2, in the double-drive mode, the torque Tm1 in the direction in which the rotation speed Nm1 of the motor MG1 is increased toward a negative side (downward direction in the graph) is output from the motor MG1 to the sun gear 31, and the torque Tm2 in the direction in which the rotation speed Nm2 of the motor MG2 is increased toward a positive side (upward direction in the graph) is output from the motor MG2 to the ring gear 32 (drive shaft 36). Thus, the hybrid vehicle 20 is able to travel by using torque from the motor MG1 and the motor MG2 while the carrier 34 (engine 22) is placed in a rotation stopped state.

Figure 3:
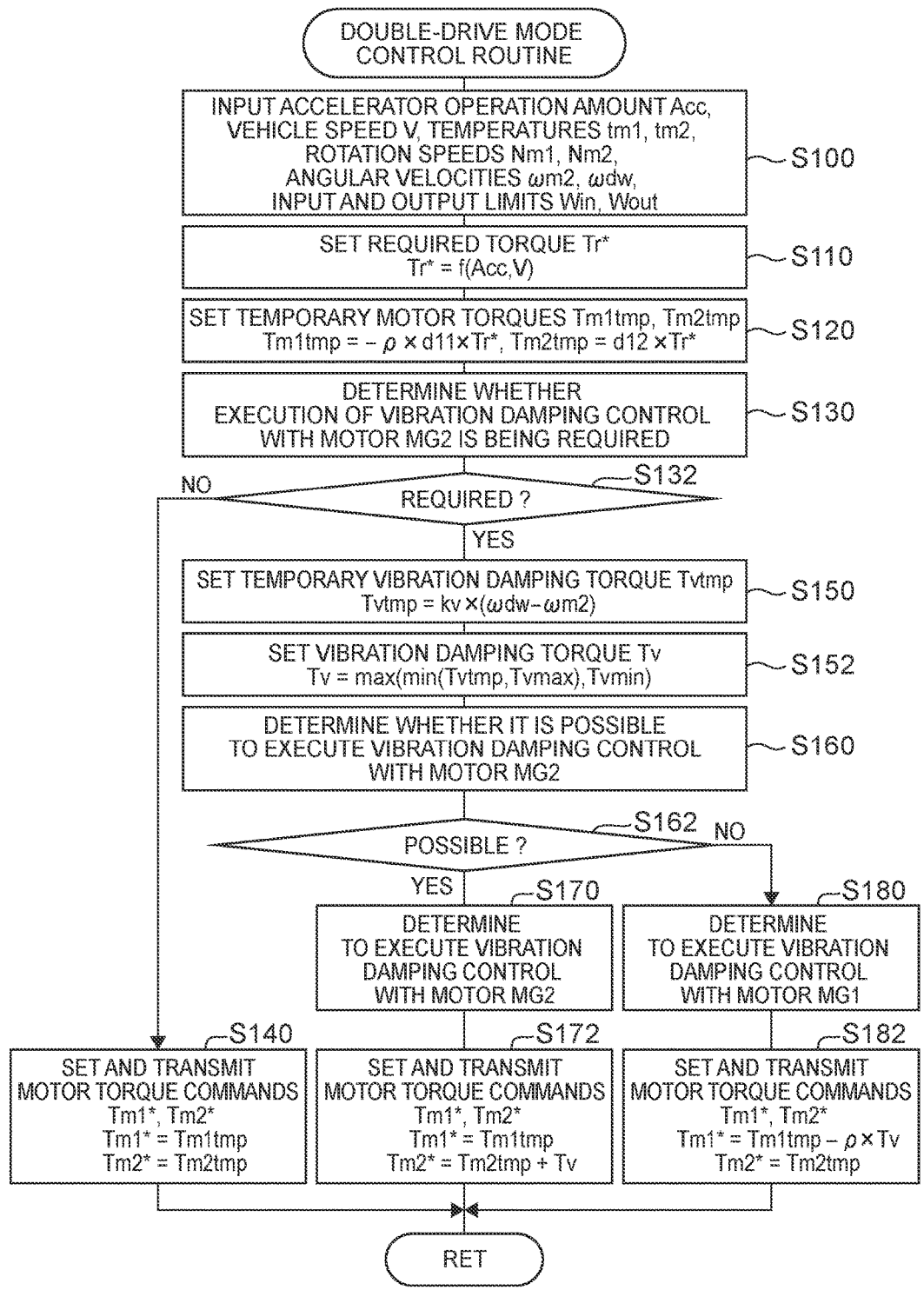
FIG. 3 is a flowchart that shows an example of a double-drive mode control routine that is executed by a hybrid electronic control unit according to the first embodiment.

FIG. 3 is a flowchart that shows an example of a double-drive mode control routine that is executed by the HV-ECU 70 according to the first embodiment. This routine is repeatedly executed at predetermined time intervals (for example, intervals of several milliseconds, or the like) when the drive mode is the double-drive mode.

As the double-drive mode control routine shown in FIG. 3 is executed, the HV-ECU 70 initially inputs data, such as the accelerator operation amount Acc, the vehicle speed V, the temperatures tm1, tm2 of the motors MG1, MG2, the rotation speeds Nm1, Nm2 of the motors MG1, MG2, the angular velocity ωm2 of the motor MG2, the drive wheel angular velocity ωdw, and the input and output limits Win, Wout of the motors MG1, MG2 (step S100). The accelerator operation amount Acc to be input is a value detected by the accelerator pedal position sensor 84. The vehicle speed V to be input is a value detected by the vehicle speed sensor 88. The temperatures tm1, tm2 of the motors MG1, MG2 to be input from the motor ECU 40 via communication are values respectively detected by the temperature sensors 45, 46. The rotation speeds Nm1, Nm2 of the motors MG1, MG2, the angular velocity ωm2 of the motor MG2, and the drive wheel angular velocity ωdw to be input via communication are values computed by the motor ECU 40. The input and output limits Win, Wout of the battery 50 to be input via communication are values computed by the battery ECU 52.

As the data are input in this way, a required torque Tr* that is required from the drive shaft 36 for propelling the hybrid vehicle 20 is set on the basis of the input accelerator operation amount Acc and the input vehicle speed V (step S110). As expressed in the following mathematical expression (1), a value obtained by multiplying the required torque Tr* by a distribution rate d11, a gear ratio ρ of the planetary gear 30 and a value (−1) is set for a temporary torque Tm1tmp as a temporary value of a torque command Tm1* of the motor MG1, and, as expressed by the mathematical expression (2), a value obtained by multiplying the required torque Tr* by a distribution rate d12 is set for a temporary torque Tm2tmp as a temporary value of a torque command Tm2* of the motor MG2 (step S120).

$$Tm1tmp=-\rho \times d11 \times Tr^* \quad (1)$$

$$Tm2tmp=d12 \times Tr^* \quad (2)$$

The distribution rate d11 is the rate of a torque (hereinafter, referred to as first distribution torque) that is output from the motor MG1 to the drive shaft 36 via the planetary gear 30 within the required torque Tr, the distribution rate d12 is the rate of a torque (hereinafter, referred to as second distribution torque) that is output from the motor MG2 to the drive shaft 36 within the required torque Tr, and the sum of the distribution rate d11 and the distribution rate d12 is 1. Since the operation in the double-drive mode is being considered, each of the distribution rates d11, d12 is larger than 0 and smaller than 1. In the single-drive mode, the distribution rate d11 is 0 and the distribution rate d12 is 1.

In the first embodiment, the distribution rates d11, d12 are set such that the efficiency of the vehicle as a whole is high within the range in which all the conditions of the following (α1) to (α5) are satisfied.

(α1) The sum of a temporary electric power consumption Pm1tmp as the electric power consumption of the motor MG1 at the time when the motor MG1 is driven by using the temporary torque Tm1tmp and a temporary electric power consumption Pm2tmp as the electric power consumption of the motor MG2 at the time when the motor MG2 is driven by using the temporary torque Tm2tmp falls within the range of the input and output limits Win, Wout of the battery 50.

(α2) The temporary torque Tm1tmp of the motor MG1 falls within the range of a rated lower limit torque Tmin11 and a rated upper limit torque Tmax11.

(α3) The temporary torque Tm1tmp of the motor MG1 falls within the range of a lower limit torque Tmin12 and an upper limit torque Tmax12 based on the temperature tm1 of the motor MG1.

(α4) The temporary torque Tm2tmp of the motor MG2 falls within the range of the rated lower limit torque Tmin21 and the rated upper limit torque Tmax21.

(α5) The temporary torque Tm2tmp of the motor MG2 falls within the range of a lower limit torque Tmin22 and an upper limit torque Tmax2 based on the temperature tm2 of the motor MG2.

In (α1), the temporary electric power consumption Pm1tmp of the motor MG1 is obtained as a product of the temporary torque Tm1tmp of the motor MG1 and the rotation speed Nm1, and the temporary electric power consumption Pm2tmp of the motor MG2 is obtained as a product of the temporary torque Tm2tmp of the motor MG2 and the rotation speed Nm2.

In (α3), when the temperature tm1 of the motor MG1 is lower than or equal to a predetermined temperature tm1ref, the lower limit torque Tmin12 is set to the rated lower limit torque Tmin11, and the upper limit torque Tmax12 is set to the rated upper limit torque Tmax11. When the temperature tm1 of the motor MG1 is higher than the predetermined temperature tm1ref, the lower limit torque Tmin12 is set to a value obtained by multiplying the rated lower limit torque Tmin11 by a load factor f1, and the upper limit torque Tmax12 is set to a value obtained by multiplying the rated upper limit torque Tmax11 by the load factor f1. The load factor f1 may be a constant value within the range of larger than or equal to 0 and smaller than 1 or may be set so as to be smaller when the temperature tm1 of the motor MG1 is high than when the temperature tm1 is low.

In (α5), when the temperature tm2 of the motor MG2 is lower than or equal to a predetermined temperature tm2ref, the lower limit torque Tmin22 is set to the rated lower limit torque Tmin21, and the upper limit torque Tmax22 is set to the rated upper limit torque Tmax21. When the temperature tm2 of the motor MG2 is higher than the predetermined temperature tm2ref, the lower limit torque Tmin22 is set to a value obtained by multiplying the rated lower limit torque Tmin21 by a load factor f2, and the upper limit torque Tmax22 is set to a value obtained by multiplying the rated upper limit torque Tmax21 by the load factor f2. The load factor f2 may be a constant value within the range of larger than or equal to 0 and smaller than 1 or may be set so as to be smaller when the temperature tm2 of the motor MG2 is high than when the temperature tm2 is low.

In the above-described mathematical expression (1), "−ρ" is a conversion coefficient for converting the torque of the drive shaft 36 (first distribution torque (d11×Tr*)) to the torque of the rotary shaft of the motor MG1 when the rotation of the carrier 34 is stopped, and is apparent from the nomograph of FIG. 2.

Subsequently, it is determined whether execution of vibration damping control with the use of the motor MG2 is being required (step S130 and step S132). When the vibrations of the vehicle relatively easily increase, the vibration damping control with the use of the motor MG2 is required in order to reduce the vibrations. In the first embodiment, when at least one of the following conditions (β1) to (β3) is satisfied, it is determined that execution of the vibration damping control with the use of the motor MG2 is being required; whereas, when all the conditions (β1) to (β3) are not satisfied, it is determined that execution of the vibration damping control with the use of the motor MG2 is not being required.

(β1) The absolute value of a variation ΔAcc per unit time in the accelerator operation amount Acc is larger than a threshold ΔAref.

(β2) The absolute value of a variation ΔTr per unit time in the required torque Tr* is larger than a threshold ΔTref.

(β3) The required torque Tr* has passed across 0 or is predicted to pass across 0 in a predetermined time.

When it is determined in step S130 and step S132 that execution of the vibration damping control with the use of the motor MG2 is not being required, the temporary torques Tm1tmp, Tm2tmp of the motors MG1, MG2 are respectively set for the torque commands Tm1*, Tm2* of the motors MG1, MG2, and these are transmitted to the motor ECU 40 (step S140), after which the routine is ended. As the motor ECU 40 receives the torque commands Tm1*, Tm2* of the motors MG1, MG2, the motor ECU 40 executes switching control over the switching elements of the inverters 41, 42 such that the motor MG1 is driven at the torque command Tm1* and the motor MG2 is driven at the torque command Tm2*.

When it is determined in step S130 and step S132 that execution of the vibration damping control with the use of the motor MG2 is being required, a value obtained by multiplying a gain kv by a value obtained by subtracting the angular velocity ωm2 of the motor MG2 from the drive wheel angular velocity ωdw is set for a temporary vibration damping torque Tvtmp as a temporary value of a vibration damping torque Tv that is required from the drive shaft 36 for executing the vibration damping control with the use of the motor MG2 (step S150), as expressed in the following mathematical expression (3). As expressed by the mathematical expression (4), a vibration damping torque Tv is set by limiting the temporary vibration damping torque Tvtmp with the vibration damping upper limit torque Tvmax and the vibration damping lower limit torque Tvmin (step S152). The vibration damping upper limit torque Tvmax and the vibration damping lower limit torque Tvmin are used in order to limit the magnitude of the vibration damping torque Tv to such an extent that it is possible to appropriately reduce the vibrations of the vehicle, and values determined by experiment, or the like, in advance may be used as the vibration damping upper limit torque Tvmax and the vibration damping lower limit torque Tvmin.

$$Tvtmp = kv \times (\omega dw - \omega m2) \quad (3)$$

$$Tv = \max(\min(Tvtmp, Tvmax), Tvmin) \quad (4)$$

Subsequently, it is determined whether it is possible to execute the vibration damping control with the use of the motor MG2 (step S160 and step S162). In the first embodiment, when all the following conditions (γ1) to (γ3) are satisfied, it is determined that it is possible to execute the vibration damping control with the use of the motor MG2; whereas, when at least one of the conditions (γ1) to (γ3) is not satisfied, it is determined that it is not possible to execute the vibration damping control with the use of the motor MG2.

(γ1) A value obtained by subtracting the temporary torque Tm2tmp of the motor MG2 from the upper limit torque Tmax23 of the motor MG2 based on the output limit Wout of the battery 50 is larger than or equal to the vibration damping upper limit torque Tvmax.

(γ2) A value obtained by subtracting the temporary torque Tm2tmp of the motor MG2 from the rated upper limit torque Tmax21 of the motor MG2 is larger than or equal to the vibration damping upper limit torque Tvmax.

(γ3) A value obtained by subtracting the temporary torque Tm2tmp of the motor MG2 from the upper limit torque Tmax22 of the motor MG2 is larger than or equal to the vibration damping upper limit torque Tvmax.

In (γ1), the upper limit torque Tmax23 of the motor MG2 is obtained by dividing a value, obtained by subtracting the temporary electric power consumption Pm1tmp (=Tm1tmp× Nm1) of the motor MG1 from the output limit Wout of the battery 50, by the rotation speed Nm2 of the motor MG2.

These conditions (γ1) to (γ3) are conditions for determining whether it is possible to output a total torque from the motor MG2 to the drive shaft 36. The total torque is the sum of the second distribution torque (d12×Tr*), that is, the temporary torque Tm2tmp of the motor MG2, and the vibration damping upper limit torque Tvmax.

When it is determined in step S160 and step S162 that it is possible to execute the vibration damping control with the use of the motor MG2, that is, when it is determined that it is possible to output the total torque from the motor MG2 to the drive shaft 36, it is determined to execute the vibration damping control with the use of the motor MG2 (step S170), the temporary torque Tm1tmp of the motor MG1 is set for the torque command Tm1* of the motor MG1, and a value obtained by adding a vibration damping torque Tv to the temporary torque Tm2tmp of the motor MG2 is set for the torque command Tm2* of the motor MG2 (step 172), after which the routine is ended. In this way, it is possible to reduce the vibrations of the vehicle by executing the vibration damping control with the use of the motor MG2.

When it is determined in step S160 and step S162 that it is not possible to execute the vibration damping control with the use of the motor MG2, that is, when it is determined that it is not possible to output the total torque from the motor MG2 to the drive shaft 36, it is determined to execute vibration damping control with the use of the motor MG1 (step S180), a value obtained by adding a product of the vibration damping torque Tv, the gear ratio ρ of the planetary gear 30 and (−1) to the temporary torque Tm1tmp of the motor MG1 is set for the torque command Tm1* of the motor MG1, and the temporary torque Tm2tmp of the motor MG2 is set for the torque command Tm2* of the motor MG2 (step S182) as expressed by the following mathematical expression (5), after which the routine is ended. The meaning of "−ρ" is described above. In this way, by executing the vibration damping control with the use of the motor MG1, it is possible to reduce the vibrations of the vehicle even when it is not possible to output the total torque from the motor MG2 to the drive shaft 36.

$$Tm1* = Tm1tmp - \rho \times Tv \quad (5)$$

In order to execute the vibration damping control with the use of the motor MG1, it is required to satisfy similar conditions to the above-described conditions (γ1) to (γ3). That is, it is required to be able to output a torque of the sum of a value, obtained by dividing the first distribution torque (d11×Tr*), that is, the temporary torque Tm1tmp of the motor MG1 by a value (−d11), and the vibration damping upper limit torque Tvmax from the motor MG1 to the drive shaft 36.

In the double-drive mode, the above-described hybrid vehicle 20 according to the first embodiment executes the vibration damping control with the use of the motor MG2 when it is possible to output the total torque, which is the sum of the second distribution torque (d12×Tr*) and the vibration damping torque Tv, from the motor MG2 to the drive shaft 36 at the time when execution of the vibration damping control with the use of the motor MG2 is being required; whereas, the hybrid vehicle 20 executes the vibration damping control with the use of the motor MG1 when it is not possible to output the total torque from the motor MG2 to the drive shaft 36. Thus, even when it is not possible to output the total torque from the motor MG2 to the drive shaft 36, it is possible to reduce the vibrations of the vehicle. That is, it is possible to further reliably reduce the vibrations of the vehicle.

Figure 4:
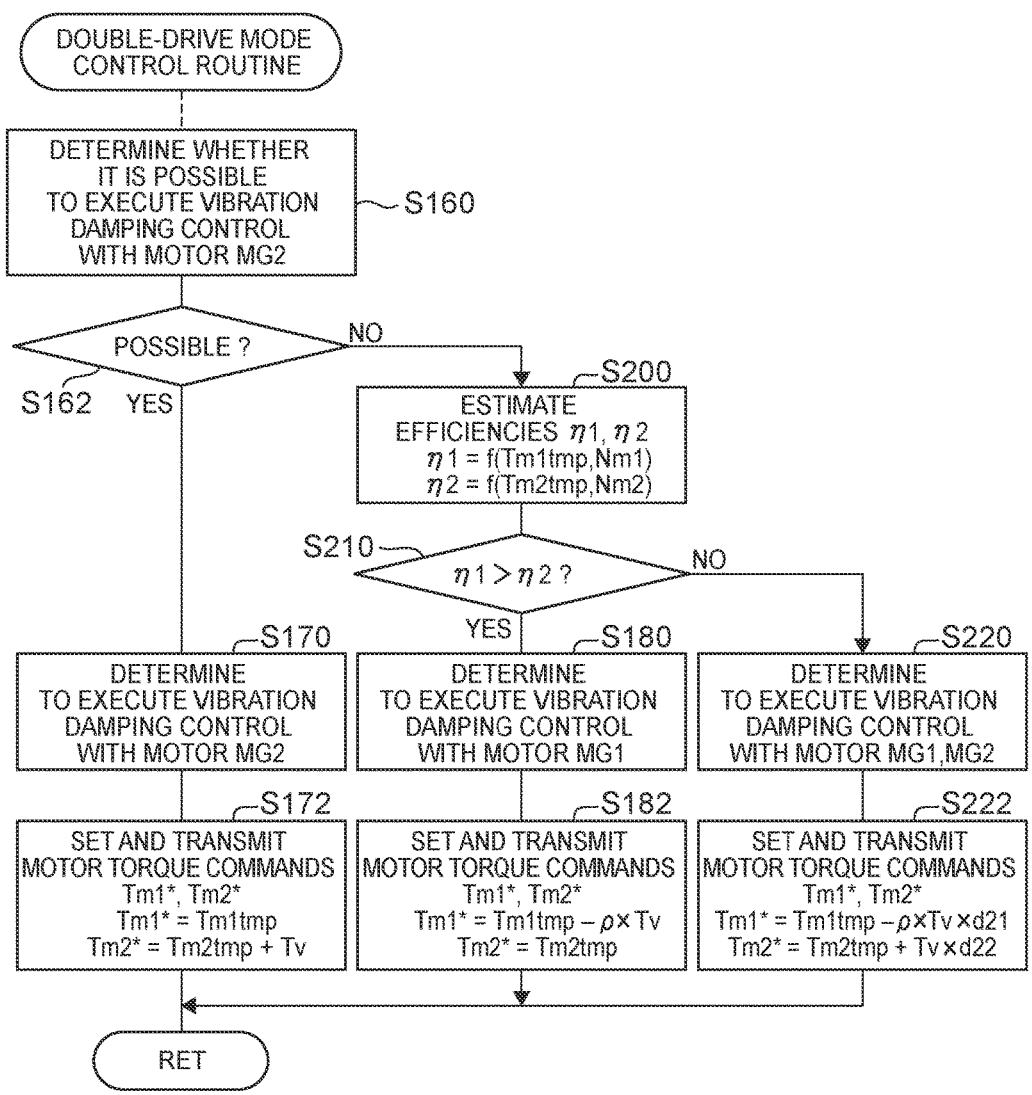
FIG. 4 is a flowchart that shows an example of a double-drive mode control routine according to an alternative embodiment of the first embodiment.

The hybrid vehicle 20 according to the first embodiment is configured to execute the double-drive mode control routine shown in FIG. 3 in the double-drive mode. Instead, the hybrid vehicle 20 may be configured to execute the double-drive mode control routine shown in FIG. 4. The double-drive mode control routine shown in FIG. 4 is the same as the double-drive mode control routine shown in FIG. 3 except that the processes of step S200 to step S222 are added. Therefore, like step numbers denote the same steps as those of the same processes or the same processes are omitted from the drawing, and the detailed description is omitted.

In the double-drive mode control routine shown in FIG. 4, when it is determined in step S160 and step S162 that it is not possible to execute the vibration damping control with the use of the motor MG2, that is, when it is determined in step S160 and step S162 that it is not possible to output the total torque from the motor MG2 to the drive shaft 36, a first efficiency η1 at the time when the motor MG1 is driven at a temporary driving point (the temporary torque Tm1tmp and the rotation speed Nm1) and a second efficiency η2 at the time when the motor MG2 is driven at a temporary driving point (the temporary torque Tm2tmp and the rotation speed Nm2) are estimated (step S200). In this alternative embodiment, the first efficiency η1 is estimated by determining and storing the relationship between the temporary torque Tm1tmp of the motor MG1, the rotation speed Nm1 and the first efficiency η1 as a map in a ROM (not shown) in advance and, when the temporary torque Tm1tmp of the motor MG1 and the rotation speed Nm1 are given, deriving the corresponding first efficiency η1 from the map. The second efficiency η2 is similarly estimated as in the case of the first efficiency η1.

As the first efficiency η1 of the motor MG1 and the second efficiency η2 of the motor MG2 are estimated in this way, the estimated first efficiency η1 of the motor MG1 and the estimated second efficiency η2 of the motor MG2 are compared with each other (step S210). When the first efficiency η1 of the motor MG1 is higher than the second efficiency η2 of the motor MG2, it is determined to execute the vibration damping control with the use of the motor MG1 (step S180), a value obtained by adding a product of the vibration damping torque Tv, the gear ratio ρ of the planetary gear 30 and a value (−1) to the temporary torque Tm1tmp of the motor MG1 is set for the, torque command Tm1* of the motor MG1, and the temporary torque Tm2tmp of the motor MG2 is set for the torque command Tm2* of the motor MG2 (step S182), after which the routine is ended.

When the second efficiency η2 of the motor MG2 is higher than or equal to the first efficiency η1 of the motor MG1 in step S210, it is determined to execute the vibration damping control with the use of the motors MG1, MG2 (step S220). As expressed by the following mathematical expression (6), a value obtained by adding a product of the vibration damping torque Tv, the distribution rate d21, the gear ratio ρ of the planetary gear 30 and a value (−1) to the temporary torque Tm1tmp of the motor MG1 is set for the torque command Tm1* of the motor MG1, and, as expressed by the mathematical expression (7), a value obtained by adding a product of the vibration damping torque Tv and the distribution rate d22 to the temporary torque Tm2tmp of the motor MG2 is set for the torque command Tm2* of the motor MG2 (step S222), after which the routine is ended.

$$Tm1^* = Tm1tmp - \rho \times Tv \times d21 \quad (6)$$

$$Tm2^* = Tm2tmp + Tv \times d22 \quad (7)$$

The distribution rate d21 is the rate of a torque that is output from the motor MG1 to the drive shaft 36 within the vibration damping torque Tv, the distribution rate d22 is the rate of a torque that is output from the motor MG2 to the drive shaft 36 within the vibration damping torque Tv, and the sum of the distribution rate d21 and the distribution rate d22 is 1. It is assumed that the vibration damping control with the use of the motors MG1, MG2 is executed, so each of the distribution rates d21, d22 is larger than 0 and smaller than 1. Since it is assumed that the second efficiency η2 of the motor MG2 is higher than or equal to the first efficiency η1 of the motor MG1, a relatively large value within the range in which the torque command Tm2* of the motor MG2 does not exceed a minimum one of the rated upper limit torque Tmax21, upper limit torque Tmax22 and upper limit torque Tmax23 of the motor MG2 is desirably set for the distribution rate d22.

In this way, at the time when it is determined that it is not possible to output the total torque from the motor MG2 to the drive shaft 36, when the first efficiency η1 of the motor MG1 is higher than the second efficiency η2 of the motor MG2, the vibration damping control with the use of the motor MG1 is executed; whereas, when the second efficiency η2 of the motor MG2 is higher than or equal to the first efficiency η1 of the motor MG1, the vibration damping control with the use of the motors MG1, MG2 is executed. Thus, it is possible to prevent a decrease in the efficiency of the vehicle at the time when the vibration damping torque Tv is output to the drive shaft 36.

In the hybrid vehicle 20 according to the first embodiment, the vibration damping upper limit torque Tvmax is used in the conditions (γ1) to (γ3). Instead of the vibration damping upper limit torque Tvmax, the vibration damping torque Tv may be used or a value obtained by adding a margin to the vibration damping torque Tv may be used.

Figure 5:
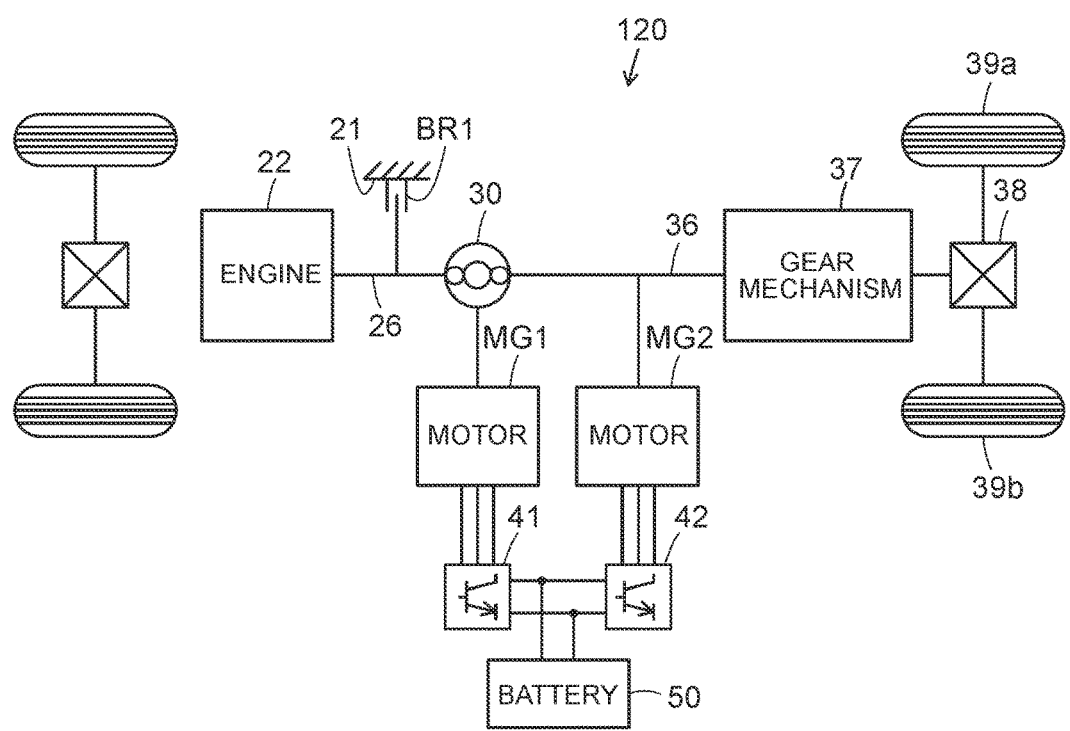
FIG. 5 is a configuration view that schematically shows the configuration of a hybrid vehicle according to a second embodiment of the present disclosure.

In the hybrid vehicle 20 according to the first embodiment, the one-way clutch CL1 is connected to the crankshaft 26 of the engine 22. Instead, a second embodiment that will be described below is also applicable. FIG. 5 shows a hybrid vehicle 120 according to the second embodiment. The hybrid vehicle 120 includes a brake BR1. The brake BR1 fixes (connects) the crankshaft 26 of the engine 22 to the case 21 such that the crankshaft 26 is not rotatable or releases the crankshaft 26 of the engine 22 from the case 21 such that the crankshaft 26 is rotatable. In this case, in the double-drive mode, the brake BR1 should be set to an engaged state, and the engine 22 should be set to a rotation stopped state.

The hybrid vehicle 20 according to the first embodiment includes the single planetary gear 30 as the planetary gear set. Instead, a hybrid vehicle may include two or more planetary gears as the planetary gear set. In this case, a hybrid vehicle 220 according to an alternative embodiment shown in FIG. 6 may be employed or a hybrid vehicle 320 according to an alternative embodiment shown in FIG. 7 may be employed.

Figure 6:
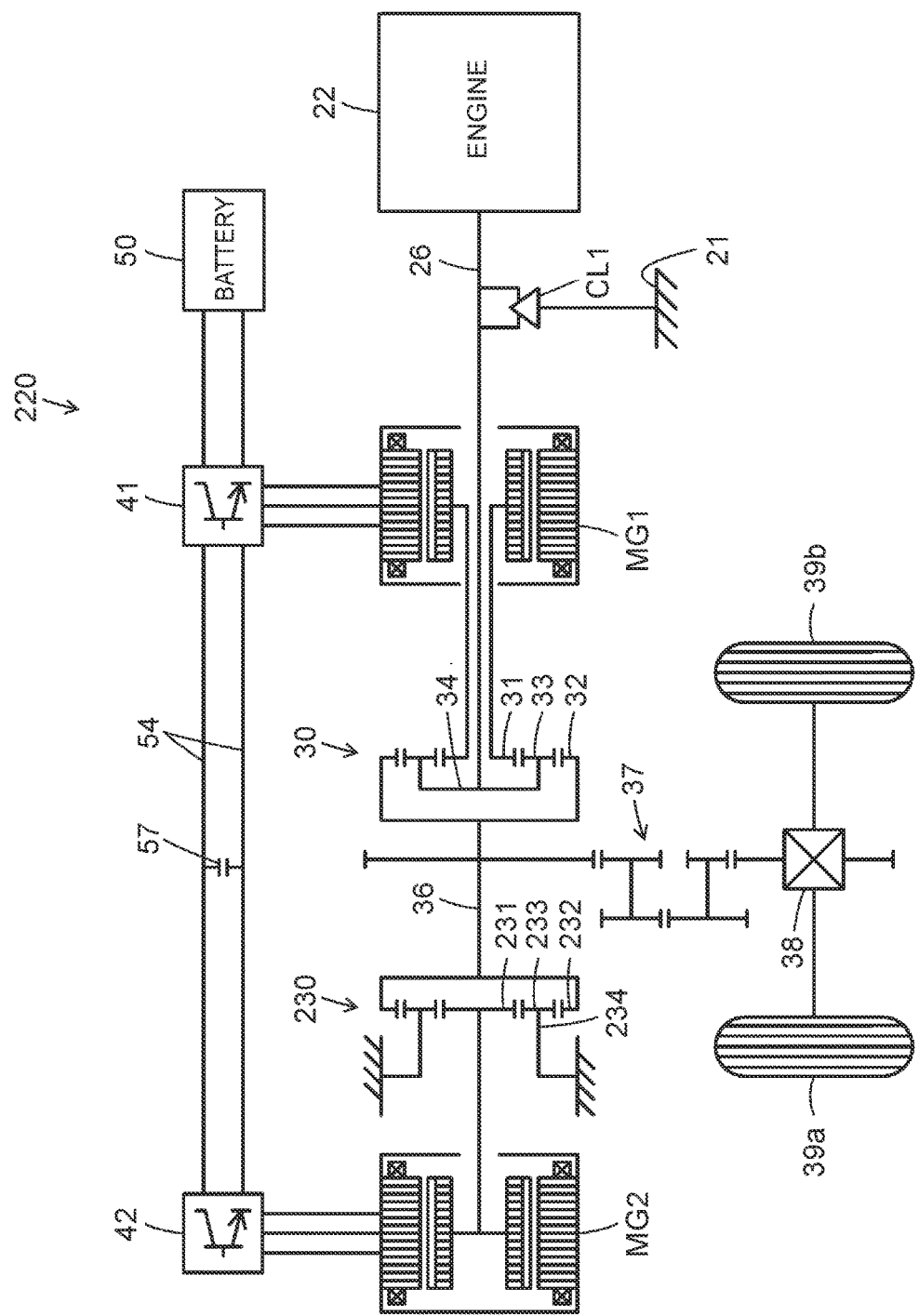
FIG. 6 is a configuration view that schematically shows the configuration of a hybrid vehicle according to a third embodiment of the present disclosure.

The hybrid vehicle 220 shown in FIG. 6 includes a planetary gear 230 in addition to the same planetary gear 30 as that of the hybrid vehicle 20 as the planetary gear set. The planetary gear 230 is a single pinion planetary gear. The planetary gear 230 includes a sun gear 231, a ring gear 232, a plurality of pinion gears 233 and a carrier 234. The sun gear 231 is an external gear. The ring gear 232 is an internal gear. The plurality of pinion gears 233 are in mesh with the sun gear 231 and the ring gear 232. The carrier 234 supports the plurality of pinion gears 233 such that each pinion gear 233 is rotatable and revolvable. The rotor of the motor MG2 is connected to the sun gear 231. The drive shaft 36 is connected to the ring gear 232. The carrier 234 is fixed to the case 21 so as to be non-rotatable. The gear ratio of the planetary gear 230 is adjusted such that the planetary gear 230 functions as a reduction gear between the motor MG2 and the drive shaft 36. The hybrid vehicle 220 is able to travel in the double-drive mode as in the case of the first embodiment.

Figure 7:
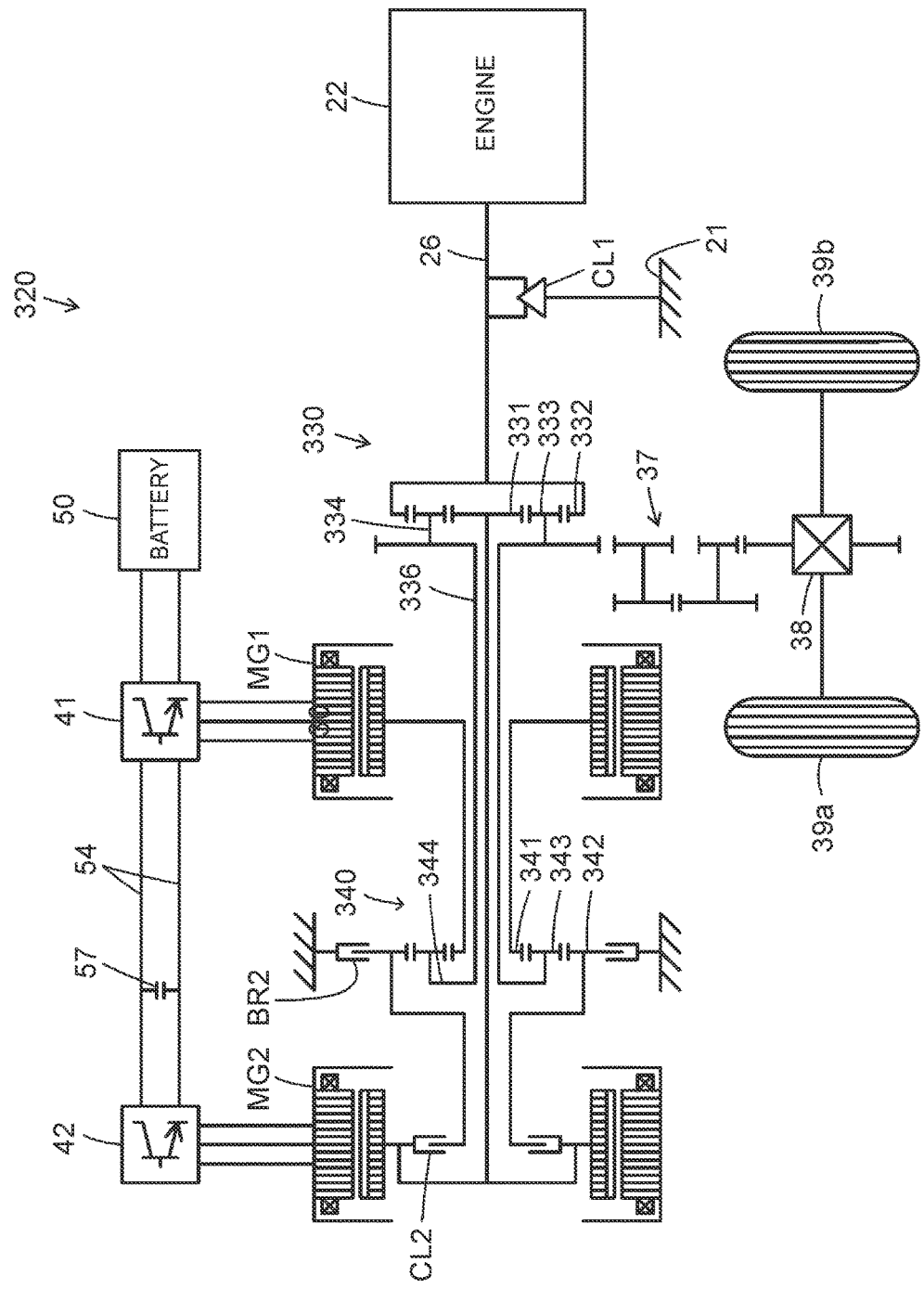
FIG. 7 is a configuration view that schematically shows the configuration of a hybrid vehicle according to a fourth embodiment of the present disclosure.

The hybrid vehicle 320 according to the alternative embodiment shown in FIG. 7 includes planetary gears 330, 340 instead of the planetary gear 30 of the hybrid vehicle 20 as the planetary gear set, and also includes a clutch CL2 and a brake BR2.

The planetary gear 330 is a single pinion planetary gear. The planetary gear 330 includes a sun gear 331, a ring gear 332, a plurality of pinion gears 333 and a carrier 334. The sun gear 331 is an external gear. The ring gear 332 is an internal gear. The plurality of pinion gears 333 are in mesh with the sun gear 331 and the ring gear 332. The carrier 334 supports the plurality of pinion gears 333 such that each pinion gear 333 is rotatable and revolvable. The rotor of the motor MG2 is connected to the sun gear 331. The crankshaft 26 of the engine 22 is connected to the ring gear 332. A drive shaft 336 coupled to the drive wheels 39a, 39b via the differential gear 38 and the gear mechanism 37 is connected to the carrier 334.

The planetary gear 340 is a single pinion planetary gear. The planetary gear 340 includes a sun gear 341, a ring gear 342, a plurality of pinion gears 343 and a carrier 344. The sun gear 341 is an external gear. The ring gear 342 is an internal gear. The plurality of pinion gears 343 are in mesh with the sun gear 341 and the ring gear 342. The carrier 344 supports the plurality of pinion gears 343 such that each pinion gear 343 is rotatable and revolvable. The rotor of the motor MG1 is connected to the sun gear 341. The drive shaft 336 is connected to the carrier 344.

The clutch CL2 connects the sun gear 331 of the planetary gear 330 and the rotor of the motor MG2 to the ring gear 342 of the planetary gear 340 or releases the connection therebetween. The brake BR2 fixes (connects) the ring gear 342 of the planetary gear 340 to the case 21 such that the ring gear 342 is non-rotatable, or releases the ring gear 342 from the case 21 such that the ring gear 342 is rotatable.

Figure 8:
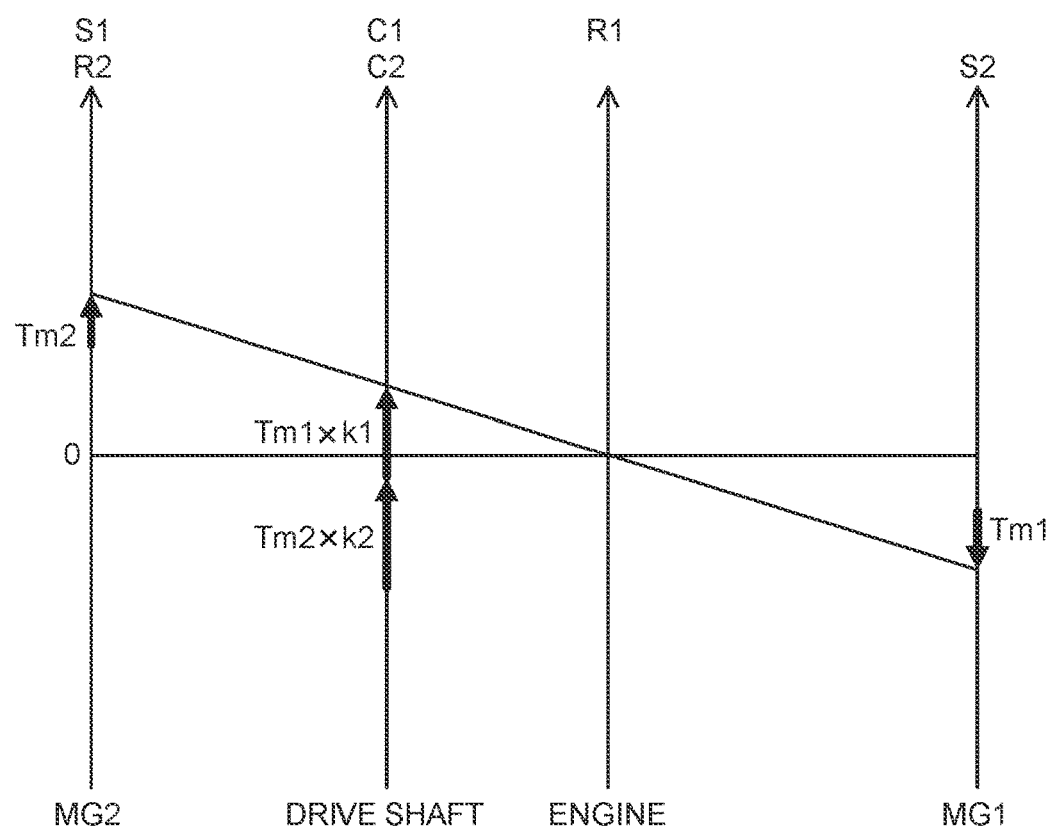
FIG. 8 is a view that illustrates an example of a nomograph of a planetary gear at the time when the hybrid vehicle travels in double-drive mode while a clutch is in an engaged state and a brake is in a released state in the fourth embodiment.
Figure 9:
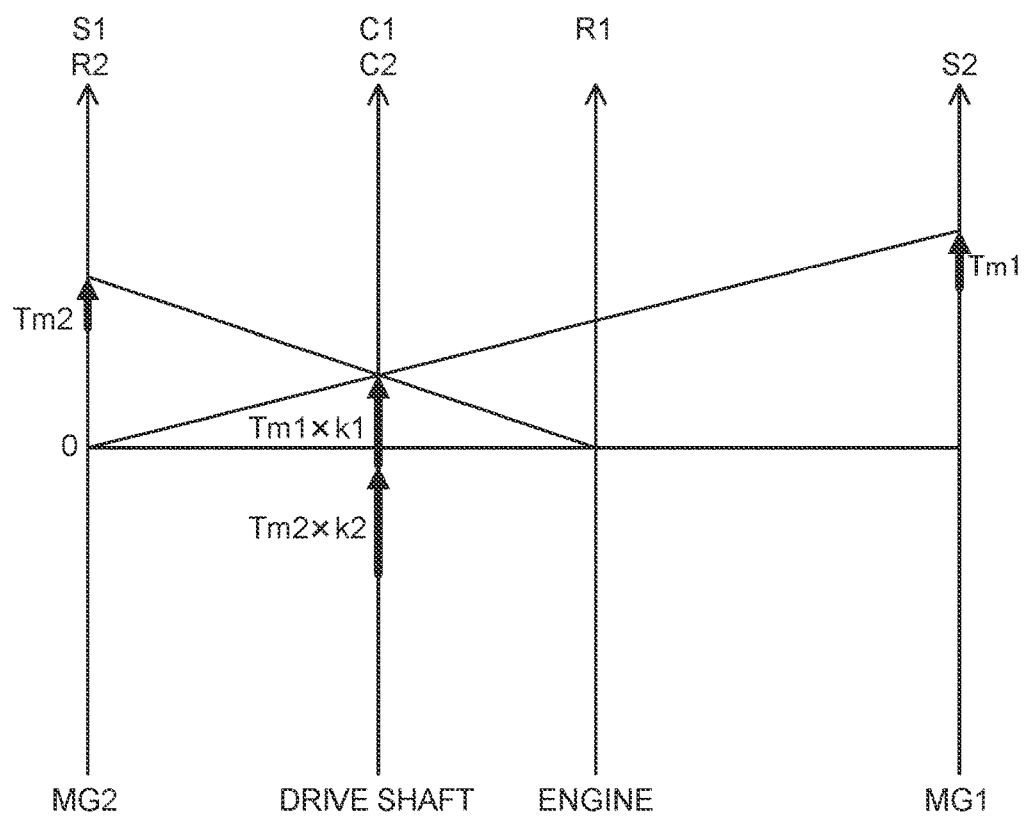
FIG. 9 is a view that illustrates an example of a nomograph of the planetary gear at the time when the hybrid vehicle travels in double-drive mode while the clutch is in a released state and the brake is in an engaged state in the fourth embodiment.

FIG. 8 is a view that shows an example of a nomograph of the planetary gears 330, 340 at the time when the hybrid vehicle 320 travels in the double-drive mode while the clutch CL2 is set to the engaged state and the brake BR2 is set to the released state. FIG. 9 is a view that illustrates an example of a nomograph of the planetary gears 330, 340 at the time when the hybrid vehicle 320 travels in the double-drive mode while the clutch CL2 is set to the released state and the brake BR2 is set to the engaged state. In FIG. 8 and FIG. 9, the S1 and R2-axis represents the rotation speed of the sun gear 331 of the planetary gear 330, which is the rotation speed Nm2 of the motor MG2, or the rotation speed of the ring gear 342 of the planetary gear 340, the C1 and C2-axis represents the rotation speed of the carrier 334 of the planetary gear 330 or the rotation speed of the carrier 344 of the planetary gear 340, which is the rotation speed of the drive shaft 336, the R1-axis represents the rotation speed of the ring gear 332 of the planetary gear 330, which is the rotation speed Ne of the engine 22, and the S2-axis represents the rotation speed of the sun gear 341 of the planetary gear 340, which is the rotation speed Nm1 of the motor MG1. In FIG. 8 and FIG. 9, the two wide-line arrows in the C1 and C2-axis respectively indicate a torque (Tm1×k1) that is output to the drive shaft 336 at the time when the torque Tm1 is output from the motor MG1 and a torque (Tm2×k2) that is output to the drive shaft 336 at the time when the torque Tm2 is output from the motor MG2. A conversion coefficient k1 is a coefficient for converting the torque Tm1 of the motor MG1 to the torque of the drive shaft 336. A conversion coefficient k2 is a coefficient for converting the torque Tm2 of the motor MG2 to the torque of the drive shaft 336.

In the case of FIG. 8, the clutch CL2 is set to the engaged state, so the rotation speed of the sun gear 331 of the planetary gear 330, which is the rotation speed Nm2 of the motor MG2, is the same as the rotation speed of the ring gear 342 of the planetary gear 340. Therefore, the planetary gears 330, 340 function as a so-called four element planetary gear set. In this case, in the double-drive mode, the torque Tm1 in the direction in which the rotation speed Nm1 of the motor MG1 is increased toward a negative side (downward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle is able to travel by using torque from the motor MG1 and the motor MG2 while the ring gear 332 (engine 22) of the planetary gear 330 is placed in the rotation stopped state.

In the case of FIG. 9, in the double-drive mode, the torque Tm1 in the direction in which the rotation speed Nm1 of the motor MG1 is increased toward a positive side (upward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle is able to travel by using torque from the motor MG1 and the motor MG2 while the ring gear 332 (engine 22) of the planetary gear 330 is placed in the rotation stopped state.

The correspondence relationship between the major elements of the embodiments and the major elements of the present disclosure described in the summary will be described. In each embodiment, the engine 22 is an example of the engine. The motor MG1 is an example of the first motor. The motor MG2 is an example of the second motor. The planetary gear 30 is an example of the planetary gear set. The one-way clutch CL1 is an example of the rotation restriction mechanism. The battery 50 is an example of the battery. The HV-ECU 70, the engine ECU 24 and the motor ECU 40 correspond to the electronic control unit.

The correspondence relationship between the major elements of the embodiments and the major elements of the present disclosure described in the summary is not intended to limit the elements of the present disclosure described in the summary since each embodiment is an example for specifically illustrating a mode for carrying out the present disclosure, described in the summary. That is the present disclosure described in the summary should be interpreted on the basis of the description in the summary, and each embodiment is merely a specific example of the present disclosure described in the summary.

The embodiments of the present disclosure are described above; however, the present disclosure is not limited to those embodiments. Of course, the present disclosure may be implemented in various forms without departing from the scope of the present disclosure.

The present disclosure is applicable to manufacturing industries of hybrid vehicles, or the like.

What is claimed is:
1. A hybrid vehicle comprising:
an engine;

a first motor;
a second motor;
a planetary gear set including at least one planetary gear, at least part of rotating elements of the at least one planetary gear being connected to the engine, the first motor, the second motor and a drive shaft coupled to an axle;
a rotation restriction mechanism configured to restrict rotation of the engine;
a battery configured to exchange electric power with the first motor and the second motor; and
an electronic control unit configured to: in double-drive mode in which the hybrid vehicle travels by using torque from the first motor and the second motor while the engine is placed in a rotation stopped state,
  (i) control the first motor so as to output a first distribution torque of a required torque from the first motor to the drive shaft, the required torque being a torque required for the drive shaft to propel the hybrid vehicle,
  (ii) control the second motor so as to output a second distribution torque of the required torque from the second motor to the drive shaft,
  (iii) execute first control when it is possible to output a total torque from the second motor to the drive shaft at a time when execution of vibration damping control with the use of the second motor is being required, the first control being control in which the second motor is controlled so as to output a vibration damping torque to the drive shaft by using torque from only the second motor, the total torque being a sum of the second distribution torque and the vibration damping torque that is a torque required for the drive shaft for the vibration damping control, and
  (iv) execute second control when it is not possible to output the total torque from the second motor to the drive shaft, the second control being control in which the first motor is controlled so as to output the vibration damping torque to the drive shaft by using torque from only the first motor.

2. The hybrid vehicle according to claim 1, wherein
in the double-drive mode, in a state where execution of the vibration damping control with the use of the second motor is being required and it is not possible to output the total torque from the second motor to the drive shaft, the electronic control unit is configured to execute the second control when a first efficiency is higher than a second efficiency, the first efficiency is an efficiency at a time when the first distribution torque is output from the first motor to the drive shaft, and the second efficiency is an efficiency at a time when the second distribution torque is output from the second motor to the drive shaft.

3. A hybrid vehicle comprising:
an engine;
a first motor;
a second motor:
a planetary gear set including at least one planetary gear, at least part of rotating elements of the at least one planetary gear being connected to the engine, the first motor, the second motor and a drive shaft coupled to an axle;
a rotation restriction mechanism configured to restrict rotation of the engine;
a battery configured to exchange electric power with the first motor and the second motor; and
an electronic control unit configured to: in double-drive mode in which the hybrid vehicle travels by using torque from the first motor and the second motor while the engine is placed in a rotation stopped state,
  (i) control the first motor so as to output a first distribution torque of a required torque from the first motor to the drive shaft, the required torque being a torque required for the drive shaft to propel the hybrid vehicle,
  (ii) control the second motor so as to output a second distribution torque of the required torque from the second motor to the drive shaft,
  (iii) execute first control when it is possible to output a total torque from the second motor to the drive shaft at a time when execution of vibration damping control with the use of the second motor is being required, the first control being control in which the second motor is controlled so as to output a vibration damping torque to the drive shaft by using torque from only the second motor, the total torque being a sum of the second distribution torque and the vibration damping torque that is a torque required for the drive shaft for the vibration damping control, and
  (iv) execute third control when it is not possible to output the total torque from the second motor to the drive shaft, the third control being control in which the first motor and the second motor are controlled so as to output the vibration damping torque to the drive shaft by using a torque from the first motor and the second motor.

4. The hybrid vehicle according to claim 3, wherein
in the double-drive mode, in a state where execution of the vibration damping control with the use of the second motor is being required and it is not possible to output the total torque from the second motor to the drive shaft, the electronic control unit is configured to execute the third control when a first efficiency is lower than or equal to a second efficiency, the first efficiency is an efficiency at a time when the first distribution torque is output from the first motor to the drive shaft, and the second efficiency is an efficiency at a time when the second distribution torque is output from the second motor to the drive shaft.

* * * * *